Patented May 30, 1939

2,160,054

UNITED STATES PATENT OFFICE 2,160,054

POLYMERIZATION PROCESS

Walter Bauer and Hellmuth Lauth, Darmstadt, Germany, assignors to Röhm & Haas Company, Philadelphia, Pa.

No Drawing. Application March 23, 1933, Serial No. 662,256. In Germany March 23, 1932

2 Claims. (Cl. 260—84)

This invention relates to a process of polymerizing acrylic acid, its homologues and the salts or esters. It has been found that a very efficient process for polymerizing acrylic acid, its homologues and their salts or esters is rendered possible by using solvents in which the monomers are soluble but the corresponding polymers are insoluble. Polymers are obtained in various new and technically important forms.

According to the present invention, esters imply such wherein the alcohol group of the monomeric esters contains at least 2 carbon atoms less than the acid group.

Moreover, other substances may also be added such as, vinyl esters, styrene, resins, caoutchouc, linseed oil, wood oil, cellulose esters, softening agents as dibutyl phthalate, methyl glycol phthalate, tributyl phosphate. Mixtures of compounds with the acrylic acid group can also be used.

Solvents comprising paraffin hydrocarbons have proved very suitable for carrying out the invention. For example, it is possible to obtain porous coherent or voluminuos non-coherent powdery polymers by using paraffin oil. Paraffin oil may also be replaced by mixtures of paraffin oil with benzine of different specific gravities or solid paraffin, ozocerite, ceresine, spermaceti and the like, also mixtures of paraffin oil and solvents as carbon tetrachloride, toluol; polyvalent alcohols as glycol are used for polymerization of salts.

The specific gravity of the solvent has an influence on the character of the polymers produced.

The porosity of the polymer (f. ex. acrylic acid methyl ester) is better when the solvent has a high specific gravity.

The polymerization is usually carried out without pressure but pressure may also be used. The same applies to the use of stirring devices. The form in which the polymers are obtained according to these processes varies and is specific for each of the compounds within the scope of the invention. For example, polymeric acrylic acid methyl ester may be obtained in the form of a coherent very porous mass, while polymeric methacrylic acid methyl ester may be obtained as very voluminous powder. There may also be obtained as powder the polymers of methacrylic acid, acrylic acid nitrile, methacrylic acid ethyl ester or acrylic acid or mixtures of these substances with each other or with other polymerizable compounds. These powders are extremely voluminous. For instance, polymeric methacrylic acid ethyl ester will occupy about 5 to 6 times the space occupied before polymerization.

The isolation of the polymers from the reaction products and their purification may be effected in any suitable manner, preferably by extraction with a low-boiling benzine or petroleum ether. Other solvents may also be used which do not dissolve or have only a slight solvent action on the polymer, such as ether in some cases.

Salts may also be polymerized by the process. For instance, sodium acrylate in glycol yields a porous polymer.

The concentrations of the solutions of monomeric compounds, with which the reaction may be carried on successfully, lie between 10 and 40% but more concentrated or more dilute solutions may also be used. The concentration of the starting solution exerts an influence on the result. For instance, acrylic acid methyl ester is polymerized to a highly porous material in a 15 to 20% paraffin oil solution. If the reaction is carried out in a 40 to 50% solution, the polymer is much less porous. Similarly, in a 35% paraffin oil solution a polymeric methacrylic acid ethyl ester may be obtained as a harder and less voluminous powder than when using a 20% solution.

If necessary, the known catalysts are used such as oxygen and substances yielding same, preferably peroxides.

The quantity of catalyst also affects the form of the polymers. While, for instance, when using about 0.5% benzoyl peroxide, polymeric methacrylic acid ethyl ester is uniformly distributed in a 20% paraffin oil solution and after isolation can be obtained as a coherent porous mass or voluminous white powder, this is not the case when four to five times the amount of benzoyl peroxide is used; the polymer is then not uniformly distributed in the paraffin oil and can only be obtained in part as powder while the remainder constitutes a more or less compact mass.

Polymerizing temperatures between 60 and 120° C. have proved very suitable but useful results may also be obtained at lower or higher temperatures.

The duration of polymerization may be from 10 to 40 hours but it may also be less or more according to the quantity of catalyst employed.

The degree of polymerization may be influenced by the polymerizing temperature and/or the quantity of catalyst and polymers may be obtained in soluble and insoluble form.

The physical properties of the polymers may be varied if the polymerization is carried out in the presence of other substances. These other substances may be polymerizable or non-polymerizable. For instance, the plasticity and elasticity of the porous polymer of acrylic acid methyl ester are decreased when polymerizing in the presence of 5% methacrylic acid ethyl ester without substantially changing the porosity. A greater decrease of the plasticity occurs for instance, when polymerizing with 5% vinyl acetate.

The properties of the powdery polymeric methacrylic acid ethyl ester may also be affected without changing its form if the ester is polymerized together with acrylic acid methyl ester, for instance 15%. The polymer prepared in this manner becomes more easily plastic in the heat and is adapted to be used as powder at suitable temperatures for producing porous materials of any desired shape, by molding under pressure with or without the use of softening agents. However, it is possible to obtain a powdery product of greater hardness by polymerizing methylacrylic acid methyl ester with, for instance, 10% of styrene.

The polymerization may also take place in paraffin oil with the addition of softening agents. For example, a polymer of substantially unchanged porosity but increased plasticity may be obtained by polymerizing acrylic acid methyl ester with 1 to 3% of linseed oil. The process is capable of standardization as to the character of the polymer produced.

A porous polymer having a fixed form may, for example, be produced directly from methacrylic acid ethyl ester by polymerizing with, for instance, 20% acrylic acid ethyl ester and 10% isobutyl phthalate, or when paraffin oil is used with other solvents as, for instance, 18–20% carbon tetrachloride, or 8% toluol, or is extracted with corresponding solvents. In this case such solvents are used for extraction which exert only a slight dissolving action on the polymer, or mixtures of non-solvents with good solvents as, for instance, petroleum ether with 5 to 20% ether or acetic ester or benzene, etc.

The porous or powdery polymers may also be pressed in the heat under pressure into pieces of any desired shape or size. The same results may be accomplished by the addition of monomeric polymerizable compounds, which preferably contain water, in the presence of a catalyst whereby the properties may again be varied at will. In both cases, filling materials and pressing materials may be used and if necessary also sulfur, or cellulose and its esters. Other natural and artificial resins may also be added such as ureaformaldehyde and other products of condensation, p-toluol-sulphonamide resins, glyptals, drying and non-drying oils.

The incorporation of the additional agents in the polymers may also be effected by polymerizing in conjunction with the additional agents, benzine being preferably used as solvent. Products are thus easily obtained which are capable of being shaped or molded in the heat.

The finely divided polymers made by this process are more readily soluble in the usual solvents than are polymers made by other methods. The preparation of varnish coatings, films and the like may be effected by directly applying the voluminous powder. The coating is formed by coating or spraying with an organic solvent or heating in an oven.

The examples have for their object to fully explain the process without limiting same to the specific conditions. The parts are parts by weight.

*Example 1.*—1 part acrylic acid methyl ester is dissolved with 0.5% benzoyl peroxide in 4.5 parts paraffin oil, specific weight 0.88 and heated 36 hours to about 80°. The polymer is distributed in the paraffin oil and almost completely fills same. After extracting with ether or petroleum ether, a very porous polymer remains, the weight of which corresponds to the quantity of acrylic acid ester employed.

*Example 2.*—1 part methacrylic acid methyl ester is dissolved with 0.4% benzoyl peroxide in 3 parts paraffin oil containing 12% benzine and heated 40 hours to 85 to 88° C. The polymer is uniformly distributed in the paraffin oil and forms therewith a technically valuable wax-like mass. After extraction with ether, it remains as a porous product or a very voluminous white powder according whether the reaction product is crushed or not before or after the extraction. The powder occupies 5 to 6 times the volume occupied by the monomeric substance. It is easily soluble in most organic solvents.

*Example 3.*—20 parts anhydrous methacrylic acid are heated with 0.04 to 0.08 part of an acetyl peroxide in 60 to 80 parts paraffin oil for a period of 15 to 20 hours to 85 to 90° C. Although the methacrylic acid is not completely soluble in the paraffin oil, an absolutely homogeneous and very soft mass is obtained as reaction product from which the polymeric acid may be isolated by extraction with petroleum ether as a voluminous white powder of the weight of the methacrylic acid employed.

*Example 4.*—10 parts dry acrylic acid nitrile are carefully heated with 0.1 to 0.2% benzoyl peroxide in 40 to 60 parts paraffin oil for a period of 35 hours to 70–90° C. By extraction with petroleum ether, the polymer is isolated as powder.

*Example 5.*—18 parts acrylic acid methyl ester and 2 parts vinyl acetate are dissolved with 1% benzoyl peroxide in a mixture of 50 parts paraffin oil and 25 parts paraffin and heated 48 hours beginning at 75° C. and rising to 84° C. The polymer which remains after extraction with petroleum ether is porous similar to that of Example 1 but less plastic.

*Example 6.*—9 parts methacrylic acid ethyl ester and 1 part acrylic acid methyl ester are heated with 0.6% benzoyl peroxide in 40 parts paraffin oil for a period of 42 hours to 80° C. The polymer is uniformly distributed in the solvent and may be obtained as powder by extraction. The powder is softer than the powder obtained in Example 2 and can be worked with a softening agent into porous materials by heating. The polymer is easily soluble in acetic ester, acetone and the like.

*Example 7.*—18 parts methacrylic acid ethyl ester, 1 part acrylic acid, 6.5 parts acrylic acid ethyl ester and 1 part isobutyl phthalate are heated with 0.7% benzoyl peroxide in 96 parts paraffin oil for a period of 40 hours to 80° C. After removal of the paraffin oil, the polymer is obtained as porous mass of the approximate weight of the polymerizable portions employed.

*Example 8.*—40 parts acrylic acid methyl ester and 10 parts acrylic acid ethyl ester are heated with 0.5 parts acetyl peroxide and 35 parts wood-meal in 150 parts paraffin oil or benzine by using a pressing device for producing pressure for a period of 40 hours to 85° C. After isolation from the solvent, a slightly flexible material is obtained which is easily plastic in the heat.

*Example 9.*—20 parts acrylic acid methyl ester and 0.08 part acetyl peroxide are dissolved in 80 parts ozokerite and heated for a period of 40 hours to 90° C. After extraction with ether or petroleum ether, about 20 parts polymer remain as a very porous product.

*Example 10.*—20 parts methacrylic acid methyl ester are dissolved with 0.1 part benzoyl peroxide in 80 parts ceresine and heated for a period of 38 hours to 85–90° C. The polymer is uniformly distributed in the reaction product and after the extraction with ether it remains as finely divided powder. The weight corresponds to that of the methacrylic acid ester employed. The polymer is easily soluble in organic solvents.

*Example 11.*—20 parts methacrylic acid ethyl ester are dissolved with 0.1 part benzoyl peroxide in a mixture of 16 parts carbon tetrachloride and 64 parts paraffin oil and heated for a period of 35–40 hours to 85–88° C. After extraction with petroleum ether, the polymer remains as porous material.

*Example 12.*—10 parts methacryllic acid ethyl ester, 4 parts methacrylic acid, 7 parts acrylic acid nitrile, 9 parts methacrylic acid methyl ester and 2 parts styrene are heated with 0.2 part benzoyl peroxide with 120 parts paraffin for a period of 40 hours to 80–90° C. After extraction with petroleum ether, the mixed polymer remains as powdery mass.

*Example 13.*—20 parts sodium acrylate are dissolved in 80 parts glycol and heated with 0.12 part benzoyl peroxide for a period of 35 hours to 90° C. The polymer produced separates out and can be extracted with methanol, whereupon about 20 parts remain as porous material.

In lieu of the 20 parts of sodium acrylate 30 parts of zinc methacrylate can be used; about 30 parts remain as porous material.

*Example 14.*—25 parts methacrylic acid ethyl ester are heated in 75 parts paraffin oil for a period of 60 hours to 95° C. A wax-like mass is produced from which the polymer may be obtained as fine powder by extraction with petroleum ether.

*Example 15.*—25 parts methacrylic acid are dissolved in 75 parts paraffin oil and heated for a period of 20 hours to 100° C. The polymerized acid is uniformly distributed in the paraffin oil while forming a wax-like mass from which it can be obtained as fine powder by extraction with petroleum ether.

*Example 16.*—20 parts dry acrylic acid are heated with 0.1 to 0.4% benzoyl peroxide in 70 to 90 parts paraffin oil for about 35 hours to 85–90° C. Although the material forms initially two layers, an almost uniform distribution takes place during the polymerization and a white solid wax-like product is obtained. By extraction with petroleum ether the polymer can be obtained in porous pieces which when ground form a very voluminous white powder. The polymerization yield amounts to about 98%.

It is understood that the above examples are merely illustrative and are in no wise meant to limit the invention the scope of which is limited only by the following claims. Wide deviations are possible without departing from the spirit of the invention. Other solvents than those specifically mentioned can be employed, the invention comprising in its broad aspect the general discovery of the fact that a very efficient process results in the use of a solvent in which the monomeric substance is soluble but in which the polymeric substance is insoluble. This process produces the polymers in an extremely important form from a technical viewpoint. In its preferred embodiment the invention comprises the polymerization of esters of acrylic and methacrylic acid and mixtures with or without the addition of other substances such as vinyl acetate, acrylic nitrile and others mentioned above to adjust the characteristics of the final product as desired by the operator. Esters of these acids other than these specifically mentioned are suitable except that when esters are employed in which the alcohol group of the monomer does not contain at least 2 carbon atoms less than the acid group they must be used with an ester that does fall within the designation referred to or with some other material mentioned above. Salts other than those specifically mentioned are suitable for the process. Temperatures, pressures and other conditions of operation may be varied without departing from the spirit of the invention.

What we claim is:

1. The process of preparing porous and voluminous polymers from a member of the group consisting of acrylic acid, homologs of acrylic acid, nitriles of acrylic acid, alkyl esters of acrylic acid and homologs of acrylic acid wherein the alcohol group contains at least two carbon atoms less than the acid group, and mixtures thereof, which comprises forming a solution of a member of said group in paraffin oil containing an organic peroxide catalyst, heating said solution to bring about polymerization of the dissolved material and extracting the paraffin oil from the mass thus formed by means of a liquid in which the paraffin oil is soluble but which is a non-solvent for the polymer.

2. The process of preparing a porous and voluminous polymer from a mixture of methyl acrylate and ethyl methacrylate which comprises forming a solution of said mixture in paraffin oil containing an organic peroxide catalyst, heating said solution to bring about polymerization of the dissolved material and extracting the paraffin oil from the mass thus formed by means of a liquid in which the paraffin oil is soluble but which is a non-solvent for the polymer.

WALTER BAUER.
HELLMUTH LAUTH.